(12) United States Patent
Kurimura et al.

(10) Patent No.: US 7,106,496 B2
(45) Date of Patent: Sep. 12, 2006

(54) ELEMENT FOR WAVELENGTH CONVERSION AND/OR OPTICAL COMPUTING

(75) Inventors: Sunao Kurimura, c/o Dokuritsugyoseihojin Busshitsu-zairyokenkyukikou Busshitsukenkyusho, 1-1, Namiki, Tsukuba-shi, Ibaraki 305-0044 (JP); Takunori Taira, 4-14-14, Tatsumi Minami, Okazaki-shi, Aichi 444-0874 (JP); Hirokazu Taniguchi, Itami (JP)

(73) Assignees: Mitsubishi Cable Industries, Ltd., Hyogo (JP); Sunao Kurimura, Ibaraki (JP); Takunori Taira, Aichi (JP)

( * ) Notice: Subject to any disclaimer, the term of this patent is extended or adjusted under 35 U.S.C. 154(b) by 0 days.

(21) Appl. No.: 10/480,905

(22) PCT Filed: Jun. 14, 2002

(86) PCT No.: PCT/JP02/05943
§ 371 (c)(1),
(2), (4) Date: Jun. 29, 2004

(87) PCT Pub. No.: WO02/103450
PCT Pub. Date: Dec. 27, 2002

(65) Prior Publication Data
US 2005/0063039 A1  Mar. 24, 2005

(30) Foreign Application Priority Data
Jun. 15, 2001 (JP) ............................. 2001-182394

(51) Int. Cl.
*G02F 1/355* (2006.01)
(52) U.S. Cl. .................. 359/326; 359/328; 359/330
(58) Field of Classification Search ......... 359/326–332
See application file for complete search history.

(56) References Cited

U.S. PATENT DOCUMENTS 6,181,463 B1 * 1/2001 Galvanauskas et al. ..... 359/330
6,744,555 B1 * 6/2004 Galvanauskas et al. ..... 359/332

OTHER PUBLICATIONS

M. Belmonte et al., Frequency doubling in $LiNbO_3$ using temperature-dependent QPM. Journal of Optics A, 1999, vol. 1, No. 1, pp. 60-63.
A. S. Chirkin et al., Quasimatched parametric interaction of optical waves with equal group velocities., Soviet Journal of Quantum Electronics, Aug. 1982, vol. 12, No. 8, pp. 1041-1043.

(Continued)

*Primary Examiner*—John D. Lee
(74) *Attorney, Agent, or Firm*—Wenderoth, Lind & Ponack, L.L.P.

(57) ABSTRACT

When forming a periodically-poled structure on a nonlinear optical crystal 1 that permits wavelength conversion and/or optical computing, the group velocity matching conditions are determined to synchronize the group velocity of the incident light L1 with that of the outgoing light L2, and the polarization reversal period of the periodically-poled structure is determined to satisfy quasi-phase matching conditions for the aforementioned wavelength conversion and/or optical computing. As a result, the problems associated with wavelength conversion of the pulsed light due to a difference in the group velocity are suppressed.

4 Claims, 2 Drawing Sheets

OTHER PUBLICATIONS

K. Hayata et al., Group-velocity-matched second-harmonic generation: An efficient scheme for femtosecond ultraviolet pulse generation in periodically domain-inverted β-BaB$_2$O$_4$. Applied Physics Letters, May 3, 1993, vol. 62, No. 18, pp. 2188-2190.

E. Sidick et al., Ultrashort-pulse second-harmonic generation. I. Transform-limited fundamental pulses. Journal of the Optical Society of America B, Sep. 1995, Vo. 12, No. 9, pp. 1704-1712.

A. Piskarskas et al., Noncollinear frequency conversion in the PPKTP. Conference on Lasers and Electro-Optics (CLEO 2000), Technical Digest., Postconference Edition. 2000, vol. 39, pp. 354-355.

N. E. Yu et al., Broad Band Quasi-Phase-Matched Second Harmonic Generation with MgO doped Periodically Poled LiNbO$_3$. Technical Digest. CLEO/Pacific Rim 2001. The 4$^{th}$ Pacific Rim Conference on Lasers and Electro-Optics. Jul. 16, 2001, vol. I, pp. I-122-I-123.

K. Mizuuchi et al., Harmonic blue light generation in bulk periodically poled MgO:LiNbO$_3$. Electronics Letters, Oct. 24, 1996, vol. 32, No. 22, pp. 2091-2092.

D. Y. Shen et al., Singly resonant optical parametric oscillator based on periodically poled MgO:LiNbO$_3$. Electronics Letters, Aug. 17, 2000, vol. 36, No. 17, pp. 1488-1489.

M. Nakamura et al., Quasi-Phase-Matched Optical Parametric Oscillator Using Periodically Poled MgO-Doped LiNbO$_3$ Crystal. Japanese Journal of Applied Physics, Nov. 1, 1999, vol. 38, Part 2, pp. L1234-L1236.

R.C. Eckardt et al., Absolute and Relative Non-linear Optical Coefficients of KDP, KD*P, BaB$_2$O$_4$, LiIO$_3$, MgO:LiNbO$_3$, and KTP Measured by Phase-matched Second-Harmonic Generation. IEEE Journal of Quantum Electronics, May 1990, vol. 26, No. 5, pp. 922-933.

J. P. Meyn et al., Periodically poled potassium niobate for second-harmonic generation at 463 mn. Optics Letters, Aug. 15, 1999, vol. 24, No. 16, pp. 1154-1156.

V. I. Kabelka, et al., Group matching of interacting light pulses in nonlinear crystals. Soviet Journal of Quantum Electronics, Aug. 1975, vol. 5, No. 2, pp. 255-256.

I. V. Tomov et al., Up-Conversion of Subpicosecond Light Pulses., IEEE Journal of Quantum Electronics, Dec. 1982, vol. QE-18, No. 12, pp. 2048-2056.

* cited by examiner

ELEMENT FOR WAVELENGTH CONVERSION AND/OR OPTICAL COMPUTING

TECHNICAL FIELD

The present invention belongs to the technical field of a nonlinear optical crystal and particularly relates to an element for wavelength conversion and/or optical computing, which is equipped with a periodically-poled structure for wavelength conversion or optical computing by a quasi-phase matching method.

BACKGROUND ART

Nonlinear optical crystals such as $LiNbO_3$, $LiTaO_3$ and the like have been preferably used as materials of elements used for wavelength conversion such as second harmonic generation (SHG), optical parametric oscillation, optical parametric generation (including amplification), difference frequency generation, sum-frequency generation and the like.

As a means for satisfying the phase matching conditions for such wavelength conversion, quasi-phase matching (QPM) including formation of a periodically-poled structure (hereinafter to be also referred to as a "poled structure") on a nonlinear optical crystal has been actively conducted in recent years. The quasi-phase matching is described in detail in, for example, a publication, Optical Second Harmonic Generation and Polarization Reversal, Kurimura, Solid-State Physics, 29(1994) (75–82) and the like.

As shown in FIG. 2, a poled structure element (wavelength conversion element) is an element wherein the polarizational direction (z direction in the Figure) of a nonlinear optical crystal 10 is periodically reversed (i.e., nonlinear optical constant has been modulated) to achieve a high wavelength conversion efficiency, and the nonlinear optical constant to be utilized is exclusively $d_{33}$, because its value is the highest. That the nonlinear optical constant $d_{33}$ can be used is the advantageous aspect of the quasi-phase matching method.

In conventional poled structure elements, what is called a z plate (crystal substrate processed to make the substrate surface perpendicular to the z-axis of optical crystal) is used and a polarization reversal period utilizing the nonlinear optical constant $d_{33}$ is formed. As shown in FIG. 2, the polarized light direction of an incident light L10 and the polarized light direction of a wavelength converted outgoing light L20 are both parallel to the z-axis of the nonlinear optical crystal. In this way, only the utilization of the nonlinear optical constant $d_{33}$ has been conventionally taken note of and group velocity matching of the incident light and the outgoing light has not been considered at all.

For wavelength conversion, a light having a pulse train (pulsed light) is sometimes used as an incident light. Examples thereof include conversion of, a pulsed light having a wavelength of 1.5 μm to a pulsed light having a wavelength of 0.78 μm by SHG, computing (e.g., sampling and gating for time-division multiplex communication, channel conversion and routing for wavelength multiplex communication) of a pulsed light having a wavelength of 1.5 μm and a pulsed light having a wavelength of 0.78 μm, and the like.

However, when the present inventors studied wavelength conversion behavior of the above-mentioned conventional poled structure element, it was found that, when a pulsed light is handled, the incident light and the outgoing light are separated in space and in time, along with the propagation of the light, due to a difference in the group velocity between the incident light and the outgoing light, and as a result, the following various problems such as those described below occur.

For wavelength conversion of continuous light, for example, since incident light exists over the entire length of the element, the conversion efficiency and computing efficiency are expected to be improved by prolongation of the element length. In contrast, when a short pulsed light is to be handled, such as pulse-number 1 Tbit/sec or above (=pulse width 1 ps or below), the incident light and the outgoing light are separated due to a difference in the group velocity between them, posing a problem in that the conversion efficiency and computing efficiency are not improved even if the element length is prolonged. A problem also occurs in that, as a result of wavelength conversion, the pulse width of the outgoing light is extended depending on the difference in the group velocity, making retention of the pulse shape difficult, and accurate computing results cannot be obtained. In some cases, a problem also occurs in that pulses before and behind in the pulse train interfere with each other and produce serious errors in computing. Such problems are clearly recognized when the pulse width is shorter and the pulse-number is higher.

In addition, since this difference in the group velocity depends on the wavelength of the incident light and the wavelength of the outgoing light (converted light), it becomes a factor that limits the wavelength band of the incident light. In a 1.5 μm band wavelength variable light source using 0.78 μm wavelength as an exciting-light source, moreover, the realizable wavelength band is limited due to the group velocity dispersion.

SUMMARY OF THE INVENTION

It is therefore an object of the present invention to provide an element for wavelength conversion and/or optical computing, wherein the above-mentioned problems associated with wavelength conversion of the pulsed light are suppressed.

Accordingly, the present invention is characterized by the following.

(1) An element for wavelength conversion or optical computing, which is a poled structure element comprising a periodically-poled structure formed on a nonlinear optical crystal, thereby to convert an incident light to an outgoing light by wavelength conversion and/or optical computing, wherein group velocity matching conditions are determined to synchronize the group velocity of the incident light with that of the outgoing light, and a polarization reversal period of the aforementioned periodically-poled structure has been determined to satisfy quasi-phase matching conditions for the aforementioned wavelength conversion and/or optical computing.

(2) The element of the above-mentioned (1), wherein the nonlinear optical crystal is MgO doped $LiNbO_3$.

(3) The element of the above-mentioned (1), wherein a nonlinear optical constant of the nonlinear optical crystal used to satisfy the above-mentioned quasi-phase matching conditions is an off-diagonal component of d tensor.

(4) The element of the above-mentioned (3), wherein the above-mentioned off-diagonal component of the d tensor is $d_{31}$.

(5) The element of the above-mentioned (1), wherein the wavelength conversion and/or optical computing are/is performed by second harmonic generation, optical parametric oscillation, optical parametric generation, sum-frequency generation or difference frequency generation.

(6) The element of the above-mentioned (1), wherein the incident light is in a pulse train having a pulse width of 1 ps or below.

DETAILED DESCRIPTION OF THE INVENTION

Figure 1:
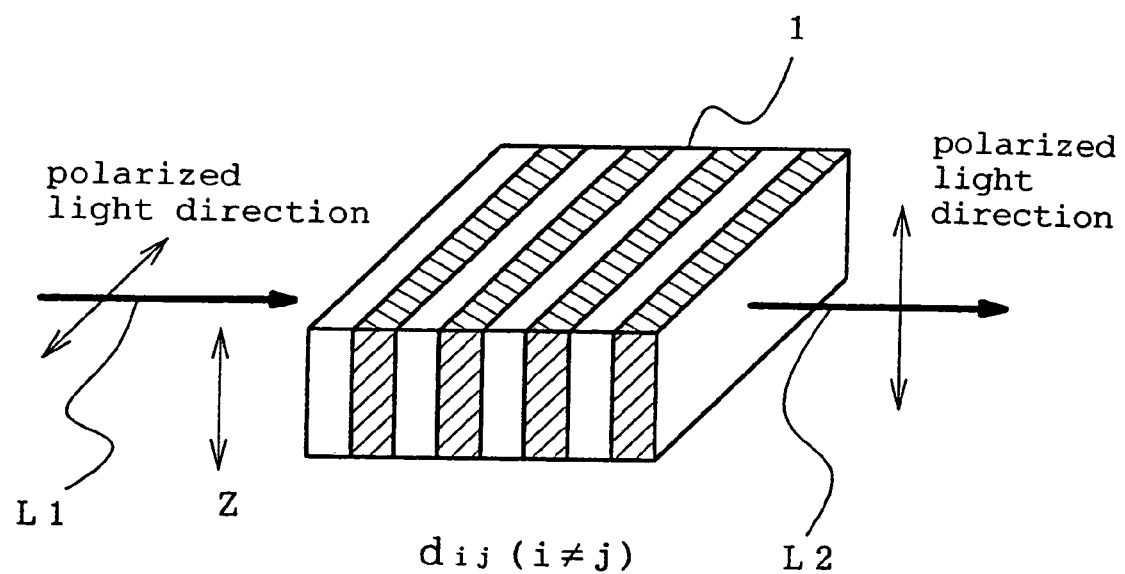
FIG. 1 is a schematic view showing the poled structure element of the present invention, wherein 1 is a nonlinear optical crystal, L1 is an incident light and L2 is an outgoing light.
Figure 2:
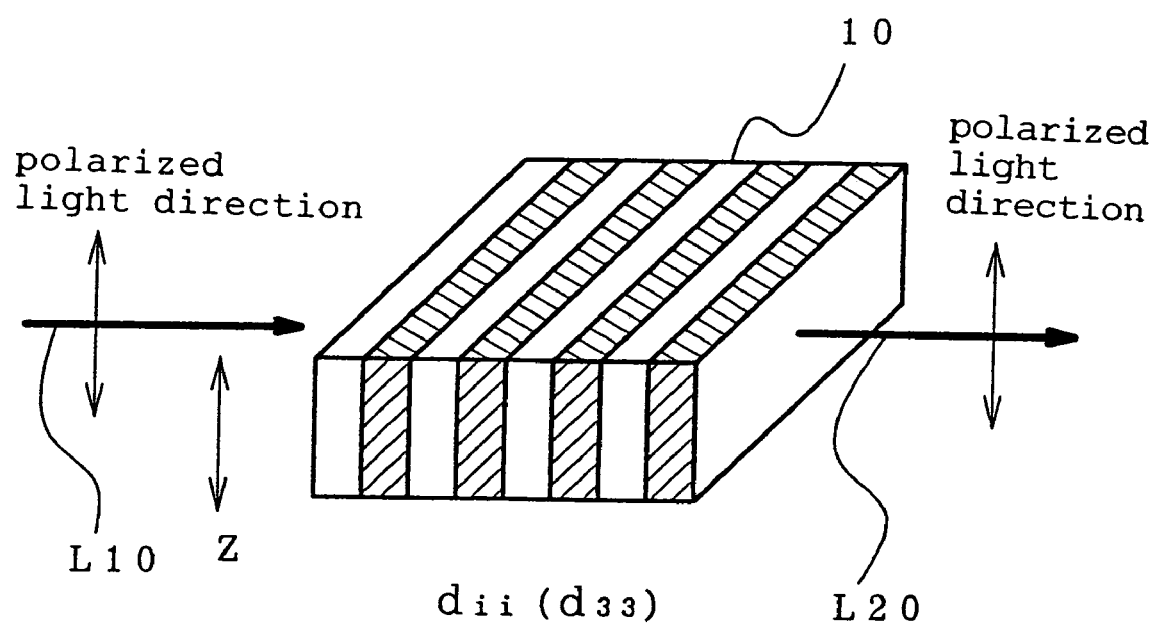
FIG. 2 is a schematic view showing a conventional poled structure element.

As shown in FIG. 1, an element for wavelength conversion and/or optical computing according to the present invention (hereinafter to be referred to as "the element" for explanation) is an element comprising a nonlinear optical crystal 1 and the poled structure formed on the crystal (in this Figure, a poled structure is formed on the entirety of the crystal). The significant characteristics here are the facts that the group velocity matching conditions are determined to synchronize the group velocity of an incident light L1 with that of an outgoing light L2, and a polarization reversal period of the aforementioned periodically-poled structure is determined to satisfy quasi-phase matching conditions for the aforementioned wavelength conversion and/or optical computing.

By constituting the element as mentioned above and quasi-phase matching while matching the group velocity between the incident light (e.g., wavelength 1.5 μm) and the outgoing light (e.g., wavelength 0.78 μm), sufficient conversion efficiency can be realized even when an ultra-short (ca. 100 fs) pulse laser beam is used as the incident light.

As described under the Background Art, the most significant characteristic of conventional poled structures is the use of $d_{33}$, the maximum value of the nonlinear optical constant (nonlinear optical tensor component). However, such an element does not take into account the group velocity matching. Thus, when a short-pulsed light is handled, the incident light pulse and the outgoing light pulse are separated soon due to the difference in the group velocity. Consequently, the distance before separation, or the length of the element effectively contributing to the wavelength conversion and/or optical computing, is only about 1 mm.

In contrast, in the present invention, since group velocity matching conditions are met and quasi-phase matching is provided utilizing an off-diagonal component of the nonlinear optical constant, even in the case of a short pulse or when the length of the element is prolonged, the incident light pulse and the outgoing light pulse are not separated over the entire length, thus contributing to the wavelength conversion and/or optical computing, which in turn increases the conversion efficiency.

Furthermore, since the element of the present invention satisfies the group velocity matching conditions, the wavelength band is dramatically broadened for, for example, a 1.5 μm band wavelength variable light source using wavelength 0.78 μm as an exciting-light source, due to the group velocity matching. Namely, when a light near 1.5 μm is to be generated by an optical parametric effect (e.g., optical parametric generation: OPG) using an exciting light (0.78 μm), the wavelength thereof is variable by changing the wavelength of the exciting light, crystal temperature and polarization reversal period, wherein a broad band wavelength variable 1.5 μm band light source can be realized using a wavelength 0.78 μm as an exciting-light source.

In addition, the element of the present invention can afford wavelength conversion and/or optical computing by quasi-phase matching without breaking the pulse shape. For optical communication and the like, a 1.5 μm light having a narrow pulse width (1 ps or below) is necessary. In the absence of group velocity matching between the exciting light (0.78 μm) and the generated light (1.5 μm), as in conventional cases, short-pulsing of an exciting light does not result in a short pulse width of the generated light, but causes poor conversion efficiency. By applying the present invention, a wavelength variable light source affording a short pulse width of the generated light and high conversion efficiency can be realized.

By determining the group velocity matching conditions to synchronize the group velocity of the incident light with that of the outgoing light (converted light) is meant selection of the angle of a nonlinear optical crystal relative to the optical path, polarized light direction of each of the incident light and the outgoing light, temperature of the crystal and the like.

In the case of a $LiNbO_3$ crystal, for example, conventional quasi-phase matching, wherein a z plate is used, the polarized light directions of both the incident light and the outgoing light are set in parallel to the z-axis and $d_{33}$ is utilized, fails to match the group velocity. In contrast, according to the present invention, for example, quasi-phase matching is performed, wherein the polarized light direction of the incident light is made to be perpendicular to the z-axis and $d_{31}$ is utilized. As a result, the polarized light direction of the outgoing light becomes parallel to the z-axis and the group velocity matching of the two is achieved while achieving the quasi-phase matching.

In addition, by employing a waveguide structure, and designing the wavelength dispersion of the waveguide, the matching with refractive index dispersion intrinsic to the material can be achieved, thereby realizing the group velocity matching. For the waveguide, a known structure such as a proton exchange waveguide, a metal diffusion waveguide such as Ti, Zn and the like, a ridge-type waveguide, dielectrics, a metal loading type waveguide and the like may be used. For example, a Ti diffusion waveguide, a Zn diffusion waveguide and a ridge waveguide permit propagation of light having polarized light directions both perpendicular and parallel to the z-axis, and therefore, are waveguide structures suitable for the present invention. Moreover, by appropriately designing the shape of the waveguide, negative group velocity dispersion can be induced, thereby offsetting the group velocity dispersion of the material.

The wavelength conversion performed by the element is exemplified by second harmonic generation (SHG), optical parametric oscillation, optical parametric generation (including optical parametric amplification), difference frequency generation, sum-frequency generation and the like. Of the wavelength conversions, an operation referred to as computing is exemplified by sampling and gating for time-division multiplex communication, channel conversion and routing for wavelength multiplex communication and the like, as mentioned above.

While the wavelength of the incident light is not limited, with the optical fiber communication in view, 1.5 μm is a preferable wavelength because a loss of optical fiber is small, dispersion of effective refractive index can be made nil, and the like.

When the incident light shows a pulse train, particularly when a short-pulsed light having a pulse width of 1 ps or below, particularly 300 fs or below, is used as the incident light, the utility of the present invention becomes particularly remarkable.

The nonlinear optical crystal usable for the element is preferably capable of utilizing nonlinear optical constant d (particularly off-diagonal component) permitting group velocity matching when forming a poled structure. For example, typical ones such as $LiNbO_3$, $LiTaO_3$, $X_A TiOX_B O_4$ ($X_A$=K, Rb, Tl, CS, $X_B$=P, As) and the like, and those obtained by doping these with various elements can be mentioned. Particularly, an MgO doped $LiNbO_3$ crystal is particularly preferable because it is superior in resistance to photorefractive damage, can act at room temperature, can produce large crystals in a large amount, can afford a crystal having high uniformity, and the like.

Of the off-diagonal components $d_{ij}$ ($i \neq j$) of the above-mentioned nonlinear optical constant d, $d_{31}$ is the largest constant next to $d_{33}$ and has a wide range of admissible phase matching and should be particularly utilized.

To utilize the off-diagonal component $d_{ij}$ ($i \neq j$), particularly $d_{31}$, of a nonlinear optical constant, the polarization reversal period is determined to satisfy the quasi-phase matching of wavelength conversion of the component.

For example, when forming an SHG element having an incident light wavelength of 1.5 μm (central wavelength 1.55 μm), using MgO doped $LiNbO_3$ as a nonlinear optical crystal, the polarization reversal period only needs to be set to 20 μm to utilize a nonlinear optical constant $d_{31}$ of the crystal. In this event, the polarized light direction of the outgoing light (wavelength 0.78 μm) and the z direction of the crystal becomes in a parallel relation, and the group velocity of the incident light (wavelength 1.5 μm) and the group velocity of the outgoing light become identical. In other words, group velocity matching is achieved. The group velocity matched incident light and outgoing light are quasi-phase matched by the aforementioned polarization reversal period.

The element is useful for the wavelength conversion of a laser beam, particularly a pulse train, and can be applied to a light source for optical communication utilizing an ultrashort pulse and an infrared broad band light source having a wide wavelength band. Whether to form a poled structure only on the optical path of a nonlinear optical crystal or the entire element can be determined depending on the form, size, object and the like of the element.

EXAMPLES

In the Examples, an SHG element having an incident light wavelength of 1.5 μm (central wavelength 1.55 μm) was actually formed using MgO doped $LiNbO_3$ as a nonlinear optical crystal, a pulse train was projected and the conversion efficiency was examined.

The polarization reversal period was set to 20 μm, the polarized light direction of the incident light and the outgoing light (SHG light: 0.78 μm) was determined, and the nonlinear optical constant $d_{31}$ of MgO doped $LiNbO_3$ was utilized to satisfy the group velocity matching conditions and quasi-phase matching conditions of the incident light and the outgoing light. The production step is shown in detail in the following.

As the crystal substrate material, a +z cut MgO doped $LiNbO_3$ crystal substrate processed into a single domain and having a thickness of 0.5 mm and the entire length in the optical path direction (=element length) of 10 mm was used. The +Z-plane and −Z-plane of the crystal substrate were optically polished. A resist membrane having a periodic stripe mask pattern (grating pattern) was formed by photolithography on the +Z-plane of the crystal substrate. The stripe mask pattern is a stripe-like pattern having a strip-mask part and a strip-exposed part alternately arranged, wherein the width of the strip-mask part was 12 μm and the width of the strip-exposed part was 8 μm. A 4000 Å thick Au coat layer was formed thereon by sputtering.

Then, a plus liquid electrode was contacted with the +Z-plane of the crystal substrate, a minus liquid electrode was contacted with the −Z-plane, a polarization-reversal potential was applied to reverse the polarization direction of the exposed part, thereby completing the poled structure to create the element of the present invention.

Comparative Example

For comparison with the above-mentioned Example, as an SHG element by the prior art, a wavelength conversion element having a poled structure was formed in the same manner as in the above-mentioned Example except that the polarization reversal period was set to 18.5 μm to utilize the nonlinear optical constant $d_{33}$.

Evaluation Test

A pulsed light having a wavelength of 1.5 μm and a pulse width of 300 fs was projected using an Er (erbium) doped fiber laser as an exciting-light source to the element obtained in the above-mentioned Example, the wavelength was converted and a pulsed light having a pulse width of 160 fs and a wavelength of 0.78 μm was allowed to go out. The polarized light direction of the incident light then was perpendicular to the z-axis of the element, and the polarized light direction of the light output by the wavelength conversion was parallel to the z-axis element, and the group velocity of both was the same. The outgoing light was due to wavelength conversion by quasi-phase matching using a nonlinear optical constant $d_{31}$.

The outgoing light was observed. As a result, the pulse was not broadened by the wavelength conversion and a conversion efficiency of 20% was achieved.

A wavelength conversion element utilizing $d_{33}$ was subjected to a similar evaluation test as in the above-mentioned Example. The polarized light direction of the incident light and the outgoing light was parallel to the z-axis of the element and the group velocity of the both was not the same. The pulse shape of the outgoing light spread along the wavelength conversion, and the conversion efficiency was as low as 1%.

INDUSTRIAL APPLICABILITY

As mentioned above, according to the present invention, the problem caused by a difference in the group velocity between the incident light and the outgoing light, which occurs during wavelength conversion of the pulsed light by quasi-phase matching has been resolved.

This application is based on a patent application No. 182394/2001 filed in Japan, the contents of which are hereby incorporated by reference.

The invention claimed is:

1. An element for wavelength conversion and/or optical computing, the element comprising:
   a nonlinear optical crystal; and
   a periodically-poled structure formed on the nonlinear optical crystal for converting an incident light into an outgoing light by wavelength conversion and/or optical computing, wherein
   group velocity matching conditions synchronize a group velocity of the incident light with a group velocity of the outgoing light, and a polarization reversal period of the periodically-poled structure satisfies quasi-phase matching conditions for the wavelength conversion and/or optical computing,
   the nonlinear optical crystal has an optical constant of $d_{31}$ which is an off-diagonal component of $d_{31}$ tensor,
   the polarization reversal period satisfies quasi-phase matching of the off-diagonal component $d_{31}$, and
   the nonlinear optical crystal is adapted to receive the incident light having a polarized light direction that is perpendicular to a z-axis of nonlinear optical crystal, the nonlinear optical crystal is adapted to output the outgoing light having a polarized light direction that is parallel to the z-axis of the nonlinear optical crystal, and the group velocity of the incident light and the group velocity of the outgoing light are the same to achieve group velocity matching.

2. The element of claim 1, wherein the nonlinear optical crystal is MgO doped $LiNbO_3$.

3. The element of claim 1, wherein the element is operable to perform the wavelength conversion and/or optical computing by second harmonic generation, optical parametric oscillation, optical parametric generation, sum-frequency generation or difference frequency generation.

4. The element of claim 1, wherein the incident light is in a pulse train having a pulse width of 1 ps or lower.

* * * * *